(12) United States Patent
Lee

(10) Patent No.: US 6,173,008 B1
(45) Date of Patent: Jan. 9, 2001

(54) RAKE RECEIVER FOR REDUCING HARDWARE CONSUMPTION AND IMPROVING SEARCH PERFORMANCE

(75) Inventor: Ji-Won Lee, Seongnam (KR)

(73) Assignee: Samsung Electronics Co., Ltd., Kyungki-Do (KR)

( * ) Notice: Under 35 U.S.C. 154(b), the term of this patent shall be extended for 0 days.

(21) Appl. No.: 09/038,092

(22) Filed: Mar. 11, 1998

(30) Foreign Application Priority Data

Apr. 26, 1997 (KR) .............................................. 1997-15760

(51) Int. Cl.[7] .......................... H04B 7/216; H04B 15/00; H04K 1/00; H04L 27/30

(52) U.S. Cl. .......................................... 375/148; 370/342

(58) Field of Search .................................... 375/147, 148, 375/150, 347, 349; 370/342, 320, 335, 441; 708/410

(56) References Cited

U.S. PATENT DOCUMENTS

| | | | |
|---|---|---|---|
| 5,237,586 | 8/1993 | Bottomley | 375/1 |
| 5,530,716 | * 6/1996 | Lipa | 370/342 |
| 5,784,293 | * 7/1998 | Lipa | 708/410 |

OTHER PUBLICATIONS

"Synchronous Digital Communication", pp. 353–354, Jul. 20, 1995 by Kyohaksa Inc.

* cited by examiner

Primary Examiner—Stephen Chin
Assistant Examiner—Betsy L. Deppe
(74) Attorney, Agent, or Firm—Sughrue, Mion, Zinn, Macpeak & Seas, PLLC

(57) ABSTRACT

A RAKE receiver for receiving a data signal transmitted from a transmitter in a spread spectrum communication system includes a symbol combiner having an adder for adding Walsh index output values, sequentially generated from a correlator using a fast Walsh transform algorithm according to N Walsh code sequences, to a value generated from a last stage of an N-stage shift register, and having the N-stage shift register for shifting an accumulated value of an output of a RAKE receiver corresponding to each index for a Walsh symbol generated from the adder each time a rake is assigned to each finger. The RAKE receiver also includes a first decision logic unit for determining a maximum value by sequentially sorting an output of the symbol combiner and generating a Walsh index corresponding to the determined maximum value as a code word; and a second decision logic unit for sorting and subtracting the output of the symbol combiner according to a state of each bit of a corresponding index and generating a probability value for the code word.

20 Claims, 4 Drawing Sheets

| WALSH INDEX | | | SIZE VALUE OF WALSH SYMBOL |
|---|---|---|---|
| B2 | B1 | B0 | |
| 0 | 0 | 0 | 3 |
| 0 | 0 | 1 | 7 |
| 0 | 1 | 0 | 5 |
| 0 | 1 | 1 | 6 |
| 1 | 0 | 0 | 20 ← Vmax |
| 1 | 0 | 1 | 4 |
| 1 | 1 | 0 | 1 |
| 1 | 1 | 1 | 2 |

Walsh — Hadamard = 8

FIG. 3A

RAKE RECEIVER FOR REDUCING HARDWARE CONSUMPTION AND IMPROVING SEARCH PERFORMANCE

BACKGROUND OF THE INVENTION

1. Field of the Invention

The present invention relates to a code division multiple access (CDMA) communication technique used in a cellular radio telephone communication system and, more particularly, to a RAKE receiver for correlating a received signal sample with a despreading code sequence to determine a received data sequence.

2. Description of the Related Art

In a spread spectrum system, if a spread spectrum signal passes through a multipath fading channel, a received signal appears in a form resulting from adding components of the signal traveling over multiple paths, each having a different amplitude and phase relative to the other components of the signal. With respect to power efficiency, it is not preferable, in this case, to receive only the one main path signal having the strongest power, since power components of the other multipath signals are lost.

In a RAKE receiver, a plurality of receivers arranged in a parallel fashion are used, as shown in FIG. 1, to unitedly perform demodulation without losing the power of components of the multipath signals. Signals output from the receivers are combined through a combiner 16. FIG. 1 is a conceptual diagram described in the book "SYNCHRONOUS DIGITAL COMMUNICATION", pp.353–354, Jul. 20, 1995 by KYOHAKSA, Inc. The time interval between multipath receivers is variable, and the multipath power component is demodulated with a delay time $\tau_i$ through a tapped delay line (TDL) 10, despreader 12, and demodulator 14. The delay time $\tau_i$ is dynamically adjusted by a control circuit (not shown). Such a construction maximizes the SNR (Signal-to-Noise Ratio) of the signal output from the RAKE receiver.

In a RAKE receiver, a rake is a logical unit including, for example, a transformer, combiner, etc. In order to receive the signals having respectively different path delays in the receiver, the rake performs its operation in the despreader process by setting the delay offset of the sample signals input to a correlator (despreader) to different delay values. A rake can be classified as either a finger or a searcher. A finger is a receipt rake for receiving and combining a plurality of multipath fading signals, and a searcher is a receipt rake for searching the signals' positions on the time base for the multipath fading signals.

Although the RAKE receiver is very good at efficiently using the signal power, there is a limit to the number of parallel circuits which can be employed, since many additional hardware circuits are required. The RAKE receiver is based on the principle that if the spectrum width of a signal at a frequency selective fading channel is greater than a delay spread value, it is possible to classify the signal components into independently faded components according to several spectrums. If the number of parallel hardware circuits is greater than the number of actual paths of the signal, the performance of the RAKE receiver is degraded. If the power strength of the signal components traveling on paths between the actual paths are similar to or equal to each other, then the RAKE receiver exhibits maximum performance.

Meanwhile, U.S. Pat. No. 5,237,586, issued on Aug. 17, 1993, entitled "RAKE RECEIVER WITH SELECTIVE RAY COMBINING", which is incorporated by reference herein, describes a RAKE receiver including multipliers for multiplying outputs of a fast Walsh transformer by a weight, accumulators for accumulating outputs of the multipliers and a decision device for detecting a received code word based on the outputs of the accumulators. In operation, a descrambler descrambles (or despreads) a received sample. A single correlator calculates result values corresponding to each Walsh index by using a FWT (Fast Walsh Transform). The multipliers multiply the result values by complex weights, and the accumulators accumulate the outputs of the multipliers. The accumulated values are supplied to the decision device. The decision device sequentially sorts the accumulated values and determines the Walsh index having the maximum value as the received code word.

However, since the RAKE receiver disclosed in the aforementioned U.S. Pat. No. 5,237,586 uses an additional accumulator with respect to each Walsh index, many hardware circuits are needed. Also, since the decision device generates only the Walsh index having the maximum value, the above-described RAKE receiver leaves much to be desired in terms of search performance, where a search is an operation for determining a signal component, that is, a pseudo noise phase component, to be demodulated by demodulator fingers within the RAKE receiver.

SUMMARY OF THE INVENTION

It is therefore an object of the invention to provide a RAKE receiver for reducing the amount of needed of hardware without deteriorating processing performance.

It is another object of the invention to provide a RAKE receiver for reducing the amount of hardware and improving search performance without deteriorating processing performance.

It is still another object of the invention to provide a method for operating a RAKE receiver which results in reducing the amount of hardware needed in the RAKE receiver without deteriorating processing performance.

It is yet another object of the invention to provide a method for operating a RAKE receiver with a reduced amount of hardware while improving search performance without deteriorating processing performance.

In one aspect of the invention, a RAKE receiver for receiving a data signal transmitted from a transmitter in a spread spectrum communication system includes: a symbol combiner having an adder for adding output values of Walsh indexes which are sequentially generated from a correlator using a fast Walsh transform algorithm according to N Walsh code sequences, to a value generated from a last stage of an N-stage shift register, and having the N-stage shift register for shifting an accumulated value of an output of the RAKE receiver corresponding to each index of a Walsh symbol generated from the adder each time a rake is assigned to each finger; a first decision logic unit for determining a maximum value by sequentially sorting an output of the symbol combiner and generating a Walsh index corresponding to the determined maximum value as a code word; and a second decision logic unit for sorting and subtracting the output of the symbol combiner according to a state of each bit of a corresponding index and generating a probability value of the code word.

BRIEF DESCRIPTION OF THE DRAWINGS

The objects discussed above and other objects, features and advantages of the invention will be more clearly understood from the following detailed description when read with the attached drawings, in which:

FIG. 3A is a table showing size values corresponding to eight (8) Walsh indexes.

DETAILED DESCRIPTION OF THE INVENTION

The present invention improves on a RAKE receiver and a symbol combiner thereof, used to cope with signal distortion caused by a signal traveling over multiple paths in a radio environment. The RAKE receiver compensates for different arrival delay times when information sent from a transmitter arrives at a receiver via different paths due to various causes such as weather, terrain, etc. To this end, the RAKE receiver receives not only a signal having the highest strength but it also receives various other signals traveling along different paths and thereby having different delay times. The RAKE receiver adds these signals to each other, thereby raising receiving sensitivity.

Figure 1:
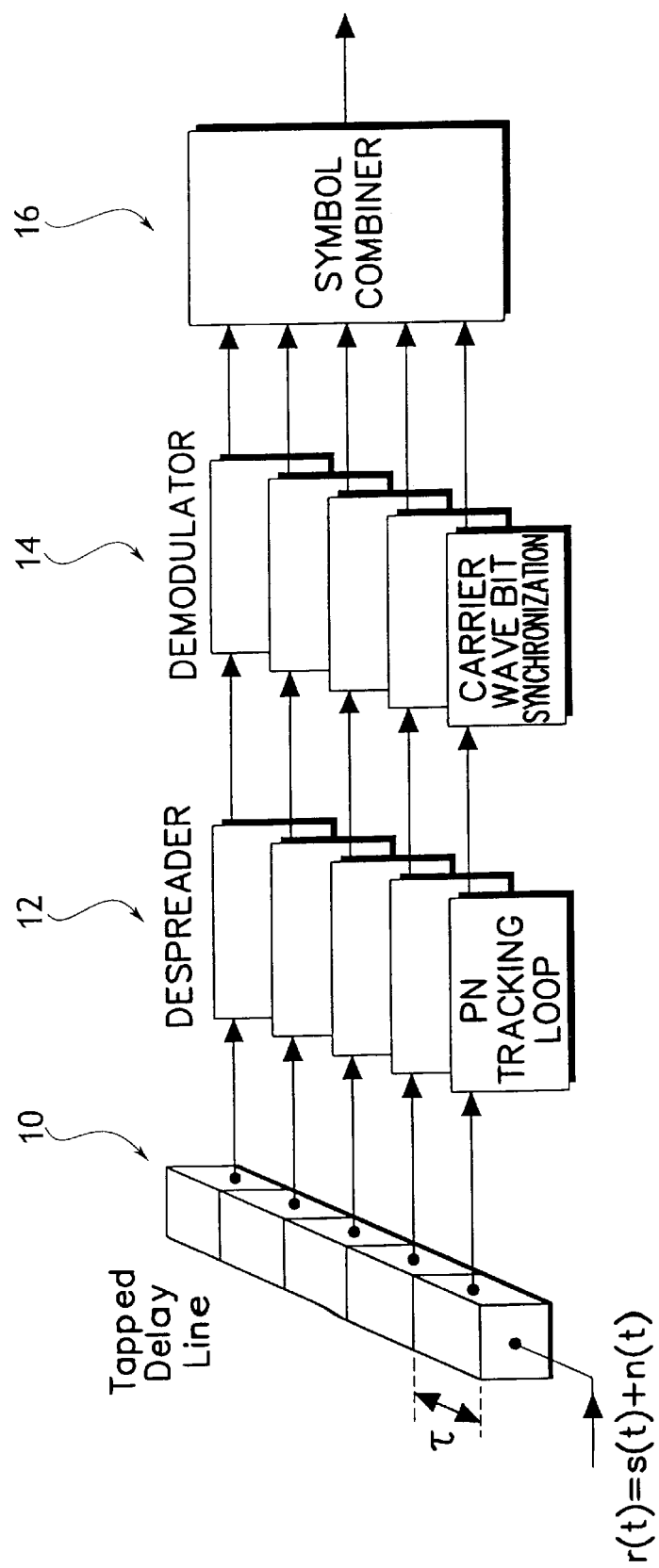
FIG. 1 is a conceptual diagram of a conventional RAKE receiver.
Figure 2:
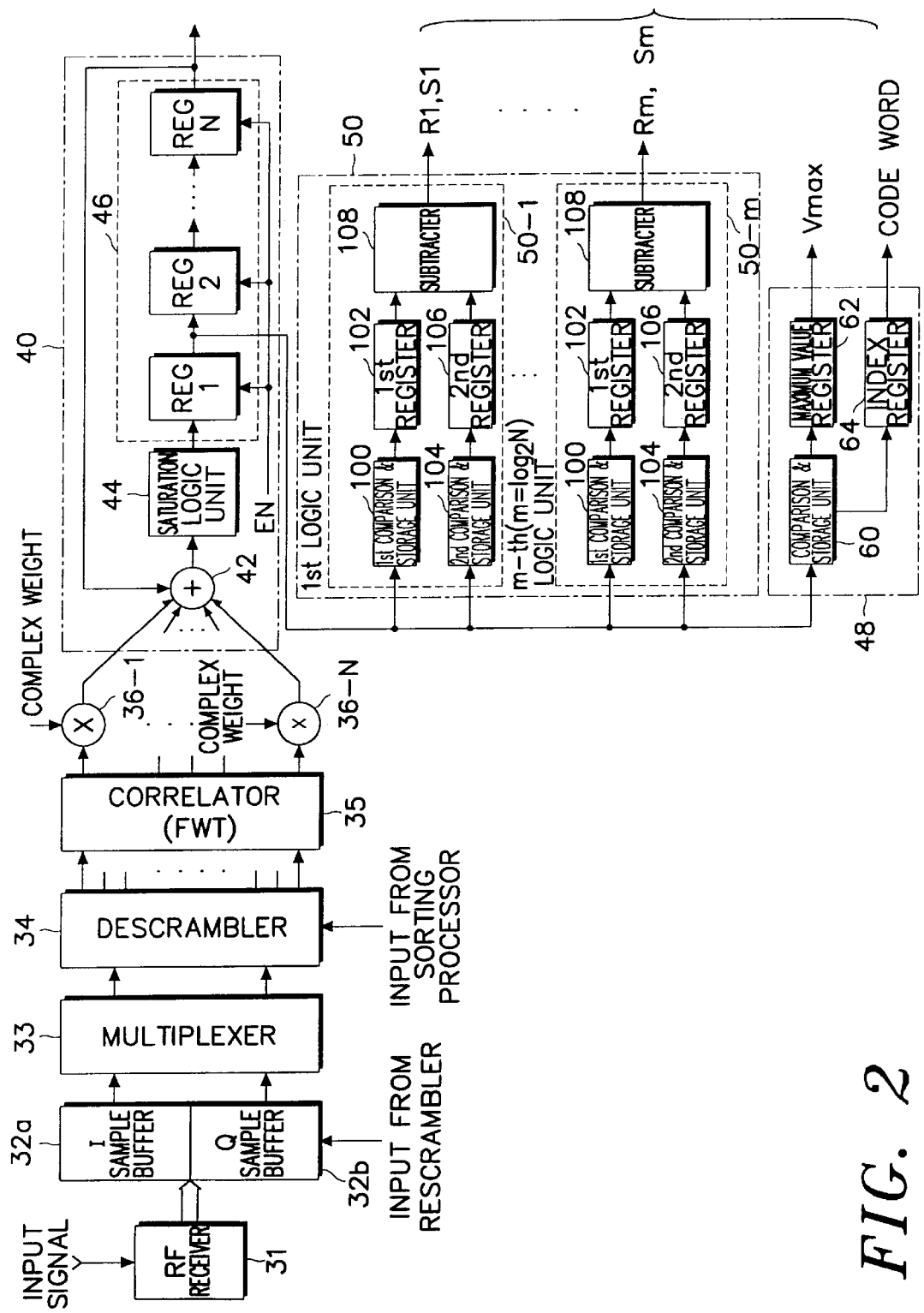
FIG. 2 is a functional block diagram of a RAKE receiver in accordance with the present invention.

FIG. 2 is a functional block diagram of a RAKE receiver according to the present invention. In FIG. 2, a radio frequency (RF) receiver 31, an in-phase (I) sample buffer 32a, a quadrature (Q) sample buffer 32b, a multiplexer 33, a descrambler 34, a single correlator 35, complex multipliers 36-1 to 36-N have the same structure as the corresponding blocks shown in FIG. 11 of U.S. Pat. No. 5,237,586 discussed above, and they perform similar operations. That is, a composite signal is received and sampled by the RF receiver 31, thereby generating I and Q samples. The I and Q samples are buffered in the I and Q buffers 32a and 32b, respectively. If a regular RAKE approach is used, the multiplexer 33 selects ranges of samples which need not correspond to different I and Q components. If a limited RAKE approach is used, the multiplexer 33 selects ranges of I and Q samples. In both cases, the selected sample ranges are independent of each other. The descrambler 34 eliminates a scrambling code from the samples either by inverting or not inverting each sample, depending on the bit polarity of the scrambling code. The samples are transmitted in parallel to the single correlator 35. The single correlator 35 simultaneously correlates the samples with several known code sequences using an FWT algorithm. The correlation results are multiplied by complex weights in the multipliers 36-1 to 36-N. In the RAKE receiver shown in FIG. 11 of U.S. Pat. No. 5,237,586, accumulators are connected to the multipliers 36-1 to 36-N and a decision device is connected to the accumulators.

In a preferred embodiment of the present invention, since the correlator 35 uses the FWT algorithm of N Walsh code sequences (Walsh-Hadamard=N), N outputs of the correlator 35 correspond to N Walsh indexes. For example, if the Walsh-Hadamard is 8, there are 8 Walsh indexes.

Unlike the RAKE receiver of U.S. Pat. No. 5,237,586, the RAKE receiver according to the present invention has a symbol combiner 40, a hard-decision logic unit 48 and a soft-decision logic unit 50, which are connected at a point in the signal flow beyond multipliers 36-1 to 36-N. The symbol combiner 40 includes an adder 42, a saturation logic unit 44, and a shift register 46 consisting of N registers, and combines received symbols with one another. The adder 42 adds values output from the multipliers 36-1 to 36-N to a value generated from the N-th register REG N of shift register 46. The saturation logic unit 44 saturates an output value of the adder 42 so as not to exceed a preset maximum value. An output of the saturation logic unit 44 is applied to the first register REG 1 of the shift register 46. Each of the registers REG 1 to REG N of the shift register 46 includes the accumulated value of the RAKE receiver output corresponding to each index of a Walsh symbol.

The hard-decision logic unit 48 and the soft-decision logic unit 50 are connected to an output of the first register REG 1 of shift register 46. The hard-decision logic unit 48 determines a maximum value by sequentially sorting the output of the first register REG 1 of shift register 46 within the symbol combiner 40, and generates the Walsh index corresponding to the determined maximum value as a code word. The hard-decision logic unit 48 includes a comparison and storage unit 60, a maximum value register 62 and an index register 64.

The soft-decision logic unit 50 sorts and subtracts the output of the first register REG 1 of shift register 46 within the symbol combiner 40 according to a state of each bit of a corresponding index, and generates a probability value for the code word. The soft-decision logic unit 50 has m ($=\log_2 N$) decision logic units 50-1 to 50-m, m being the number of bits constituting each Walsh index. Each of the decision logic units 50-1 to 50-m includes first and second comparison and storage units 100 and 104, first and second registers 102 and 106, and a subtracter 108. The first comparison and storage unit 100 determines a maximum value by sequentially sorting a corresponding output value according to binary logic "0" of the constituent bits, and stores the determined maximum value in the first register 102. The second comparison and storage unit 104 determines a maximum value by sequentially sorting a corresponding output value according to binary logic "1" of the constituent bits, and stores the determined maximum value in the second register 106. If the Walsh symbol for a single period is processed, the subtracter 108 subtracts the value stored in the second register 106 from the value stored in the first register 102 and generates result values R1–Rm. The result values R1–Rm are standards indicating the probability of the code word determined in the hard-decision logic unit 48. Sign values S1–Sm of the result values R1–Rm are equal to the code word.

Operation of the RAKE receiver according to the present invention is now described in detail. For convenience, it is assumed that the Walsh-Hadamard is eight (8), although in a typical CDMA system, the Walsh-Hadamard is 64.

Figure 3B:
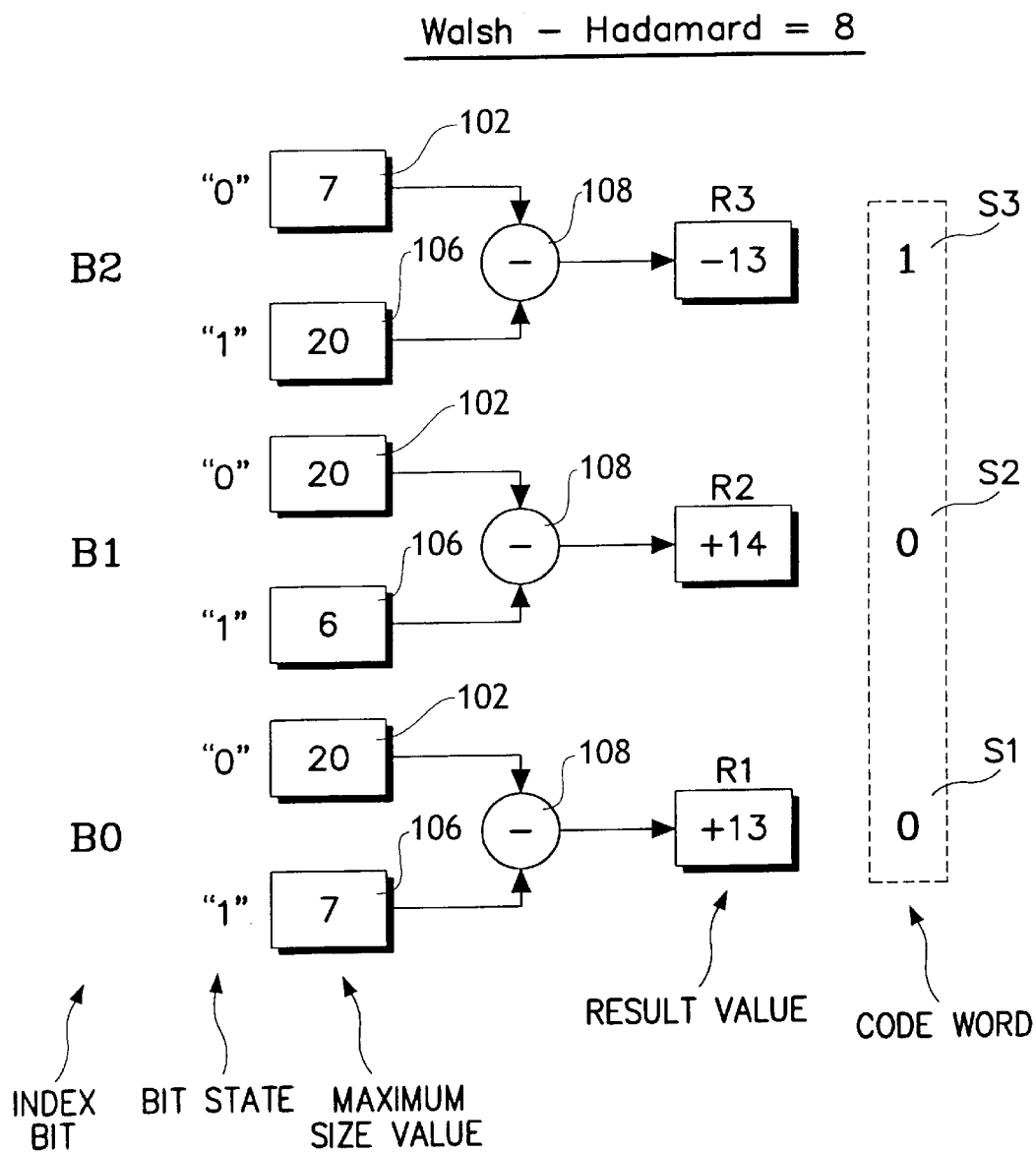
FIG. 3B is a diagram for explaining the operation of an embodiment of the soft-decision logic unit shown in FIG. 2.

FIGS. 3A and 3B describe the operation of the soft-decision logic unit 50. FIG. 3A depicts a table showing size values corresponding to eight (8) Walsh indexes. FIG. 3B depicts the operation of an embodiment of the soft-decision logic unit 50.

The size values of the Walsh symbols corresponding to the Walsh indexes of correlator 35 are shown in FIG. 3A. The Walsh symbols corresponding to the Walsh indexes are multiplied by the weights in multipliers 36-1 to 36-N. The multiplication results are sequentially applied to adder 42 which adds the size values of the Walsh symbols to the value generated and held in the N-th register REG N of shift register 46. Since it is assumed that there are eight (8) Walsh indexes, shift register 46 has eight (8) registers. Therefore, the two input sources added by adder 42 are a symbol size value of a previous rake for a corresponding index and a symbol size value of a current rake. The result obtained by adder 42 is supplied to the saturation logic unit 44. Since the result of the adder 42 is obtained by repeatedly adding the symbol size values for various rakes, an overflow condition may occur. If the output of adder 42 exceeds a preset maximum value, the saturation logic unit 44 replaces that output value with the maximum value. The output of saturation logic unit 44 is applied to the first register REG 1 of the shift register 46. An enable signal EN is supplied to the first to N-th registers (REG 1 to REG N) of shift register 46 each time the rake is assigned to a finger. The shift register 46 right-shifts the accumulated value whenever the enable signal EN is applied. As a result, registers REG 1 to REG N of shift register 46 hold the accumulated value of an output of the RAKE receiver corresponding to each Walsh symbol index.

The output of first register REG 1 of shift register 46 is applied to the soft-decision logic unit 50. The output of first register REG 1 is also applied to the comparison and storage unit 60 of the hard-decision logic unit 48. For example, as indicated in FIG. 3, the size values 3, 7, 5 , . . . , 1 and 2, corresponding to the Walsh indexes, are sequentially supplied to the comparison and storage unit 60 of the hard-decision logic unit 48. The comparison and storage unit 60 compares a previous size value with a current size value and stores the larger value in an internal storage unit. For instance, if a size value three (3) of a Walsh index 000 is compared with a size value seven (7) of a Walsh index 001, the size value seven (7) is stored in the internal storage unit. In this case, the index 001 for the larger value seven (7) is also stored in the internal storage unit. If such a process is repeated for one period, a maximum size value Vmax and the index corresponding thereto are stored in the internal storage unit. Referring to FIG. 3A, the maximum size value Vmax, in this example, is 20 and its corresponding index is 100. The maximum size value Vmax is temporarily stored in the maximum value register 62 and the index 100 corresponding thereto is temporarily stored in the index register 64. The index temporarily stored in index register 64 corresponds to the code word.

Meanwhile, the size values corresponding to the Walsh indexes of bits B0, B1 and B2 having binary logic "0" among the output values of the first register REG 1 of shift register 46 are sequentially applied to each first comparison and storage unit 100 of first to m-th (where m is three (3) in this case) logic units 50-1 to 50-m of the soft-decision logic unit 50. For example, the size values 3, 5, 20 and 1, corresponding to the Walsh indexes of the least significant bit (LSB) B0 having a binary logic value of "0", are sequentially supplied to the first comparison and storage unit 100 of the first logic unit 50-1. The size values 3, 7, 20 and 4, corresponding to the Walsh indexes of the bit B1 having a binary logic value of "0", are sequentially supplied to the first comparison and storage unit 100 of the second logic unit 50-2. The size values 3, 7, 5 and 6, corresponding to the Walsh indexes of the most significant bit (MSB) B2 having a logic value of "0", are sequentially supplied to the first comparison and storage unit 100 of third logic unit 50-3. Each first comparison and storage unit 100 of the logic units 50-1 to 50-3 compares the previous output value with the current output value and stores the larger value in an internal storage unit. The maximum size values 20(B0), 20(B1) and 7(B2) for a binary logic value of "0" determined for one period are temporarily stored in each first register 102 of the logic units 50-1 to 50-3, respectively.

The size values corresponding to the Walsh indexes for bits B0, B1 and B2, having a binary logic value of "1" among the output values of the first register REG 1 of shift register 46, are sequentially applied to each second comparison and storage unit 104 of logic units 50-1 to 50-3 of the soft-decision logic unit 50. The second comparison and storage unit 104 and the second register 106 of logic units 50-1 to 50-3 operate similar to the first comparison and storage unit 100 and the first register 102. The maximum size values 7 (B0), 6 (B1) and 20 (B2), for a binary logic value of "1" determined for one period, are temporarily stored in each second register 106 of logic units 50-1 to 50-3, respectively.

The maximum size values which are temporarily stored in the first register 102 and the second register 106, according to each of the binary logic states "0" or "1" for the bits B0, B1 and B2 of the Walsh index, are shown in FIG. 3B. Each subtracter 108 of logic units 50-1 to 50-3 subtracts the value stored in the second register 106 from the value stored in the first register 102 and generates the result values R1–R3. Referring to FIG. 3B, the result values are as follows: R1=+13, R2=+14, and R3=−13. The result values R1–R3 indicate the probability of the code word determined in the hard-decision logic unit 48, in which the larger the size of the result value, the higher the probability of the code word. If the result value is a positive number, the sign value is "0", and if it is a negative number, the sign value is "1". Therefore, the sign values S1–S3 are 0, 0 and 1 which are equal to the code word (B0=0, B1=0 and B2=1). The output values (R1, S1) to (R3, S3) of the soft-decision logic unit 50 speed up determination for the signal component to be demodulated. That is, the soft-decision logic unit 50 raises search performance.

The outputs of the hard-decision logic unit 48 and the soft-decision logic unit 50 are applied to a subsequent signal processor, such as a channel decoder, for example. The channel decoder determines the signal component to be demodulated by using the outputs of the hard-decision logic unit 48 and the soft-decision logic unit 50, and demodulates the signal component.

As may be apparent from the aforementioned description, the RAKE receiver according to the present invention is useful in reducing the amount of required hardware without lowering processing performance. For example, if 64 Walsh codes are used, a conventional RAKE receiver requires 64 accumulators. However, the preferred embodiment of the present invention described above uses only one accumulator and yet does not lower the processing speed. Moreover, since the present invention utilizes a soft-decision, the search performance is improved.

While the invention has been particularly shown and described with reference to a preferred embodiment, it will be understood by those skilled in the art that various changes in form and details may be made therein without departing from the spirit and scope of the invention as defined by the appended claims. That is, other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A RAKE receiver for receiving a data signal transmitted from a transmitter in a spread spectrum communication system, comprising:

a symbol combiner for combining transmitted symbols, said symbol combiner including;

an adder for adding Walsh index values to a value generated by a last stage of an N-stage shift register, wherein the Walsh index values are sequentially generated by a correlator using a fast Walsh transform algorithm according to N Walsh code sequences; and said N-stage shift register for shifting an accumulated value of an output of the RAKE receiver corresponding to each Walsh index value generated by said adder each time a rake is assigned to each finger;

a first decision logic unit for determining a third maximum value by sequentially sorting an output of said symbol combiner and generating a Walsh index corresponding to the determined maximum value as a code word; and a second decision logic unit for sorting the output of said symbol combiner according to first and second binary logic states of each bit of a corresponding Walsh index to determine first and second maximum values and subtracting the first and second maximum values to generate a probability value for said code word.

2. The RAKE receiver as set forth in claim 1, wherein said symbol combiner further includes a saturation logic unit connected between said adder and said N-stage shift register, wherein said saturation logic unit saturates an output value of said adder so as not to exceed a maximum value.

3. The RAKE receiver as set forth in claim 1, wherein said second decision logic unit includes M decision logic units, where M is the number of bits of said Walsh index, wherein each of the M decision logic units comprises:

a first maximum value determiner for determining the first maximum value by sequentially sorting an output value of said symbol combiner according to a first binary logic state of a corresponding bit of the output value;

a second maximum value determiner for determining the second maximum value by sequentially sorting the output value of said symbol combiner according to a second binary logic state of the corresponding bit of the output value; and a subtracter for subtracting the second maximum value of said second maximum value determiner from the first maximum value of said first maximum value determiner.

4. The RAKE receiver as set forth in claim 3, wherein said output of the symbol combiner is an output of a first stage of the N-stage shift register.

5. The RAKE receiver as set forth in claim 3, wherein said first decision logic unit comprises:

a third maximum value determiner for determining the third maximum value by sequentially sorting said output value of said symbol combiner;

a maximum value storage unit for storing and outputting a size of the determined third maximum value as a size of the code word; and an index storage unit for storing and outputting the Walsh index corresponding to the value having the determined third maximum value.

6. The RAKE receiver as set forth in claim 5, wherein said output of the symbol combiner is an output of a first stage of the N-stage shift register.

7. A receiver for receiving a data signal transmitted from a transmitter, comprising:

a symbol combiner for combining symbols transmitted by the transmitter, said symbol combiner including;

an adder for adding index values of the symbols to a value generated from a last stage of an N-stage shift register and producing an added index value, wherein the index values are sequentially generated by a correlator using a transform algorithm; and said N-stage shift register for shifting the added index value generated by said adder each time a rake is assigned to a finger, thereby holding an accumulated value corresponding to one of the symbols, the held value being an output of the receiver;

a first decision logic unit for determining a third maximum value by sequentially sorting an output of said symbol combiner and generating an index corresponding to the determined maximum value as a code word; and a second decision logic unit for sorting the output of said symbol combiner according to first and second binary logic states of a bit of the corresponding index to determine first and second maximum values and subtracting the first and second maximum values thereby generating a probability value for said code word.

8. The receiver as set forth in claim 7, wherein said transform algorithm is a fast Walsh transform algorithm and the index values are Walsh index values.

9. The receiver as set forth in claim 8, wherein said transform algorithm generates the Walsh index values according to N Walsh code sequences, where N is an integer.

10. The receiver as set forth in claim 7, wherein said symbol combiner further includes a saturation logic unit connected between said adder and said N-stage shift register, wherein said saturation logic unit saturates an output value of said adder so the added index value provided to the N-stage shift register does not exceed a maximum value.

11. The receiver as set forth in claim 7, wherein said second decision logic unit includes M decision logic units, where M is the number of bits of the corresponding index, wherein each of the M decision logic units comprises:

a first maximum value determiner for determining the first maximum value by sequentially sorting the value output from said symbol combiner according to a first binary logic state of a corresponding bit of the output value;

a second maximum value determiner for determining the second maximum value by sequentially sorting the value output from said symbol combiner according to a second binary logic state of the corresponding bit of the output value; and a subtracter for subtracting the second maximum value of said second maximum value determiner from the first maximum value of said first maximum value determiner.

12. The RAKE receiver as set forth in claim 11, wherein said output of the symbol combiner is an output of a first stage of the N-stage shift register.

13. The RAKE receiver as set forth in claim 11, wherein said first decision logic unit comprises:

a third maximum value determiner for determining the third maximum value by sequentially sorting an output value of said symbol combiner;

a maximum value storage unit for storing and outputting a size of the determined third maximum value as a size of the code word; and an index storage unit for storing and outputting the Walsh index corresponding to the value having the determined third maximum value.

14. The RAKE receiver as set forth in claim 13, wherein said output of the symbol combiner is an output of a first stage of the N-stage shift register.

15. A method for receiving a data signal transmitted from a transmitter, comprising:

(a) combining symbols transmitted by the transmitter, including:

(a1) adding index values of the symbols to a value of a previously generated added index value, wherein the index values are sequentially generated according to a transform algorithm; and (a2) shifting the added index values each time a rake is assigned to a finger;

(b) determining a third maximum value by sequentially sorting the shifted added index values and generating an index corresponding to the third maximum value as a code word; and (c) sorting the shifted added index values according to first and second binary logic states of a bit of the corresponding index to determine first and second maximum values and subtracting the first and second maximum values thereby generating a probability value for said code word.

16. The method as set forth in claim 15, wherein said transform algorithm is a fast Walsh transform algorithm and the index values are Walsh index values.

17. The method as set forth in claim 16, wherein said transform algorithm generates the Walsh index values according to N Walsh code sequences, where N is an integer.

18. The method as set forth in claim 16, wherein said generating an index corresponding to the third maximum value as a code word comprises:

(b1) storing and outputting a size of the third maximum value as a size of the code word; and (b2) storing and outputting the Walsh index corresponding to the value having the third maximum value.

19. The method as set forth in claim 15, further comprising:

(d) providing a saturated output value as the added index value so as not to exceed a maximum value when adding the index values.

20. The method as set forth in claim 15, wherein said generating a probability value comprises:

(c1) determining the first maximum value by sequentially sorting the shifted added index values according to a first binary logic state of a corresponding bit of the output value;

(c2) determining the second maximum value by sequentially sorting the shifted added index values according to a second binary logic state of the corresponding bit of the output value; and (c3) subtracting the second maximum value from the first maximum value, thereby producing the probability value for said code word.

* * * * *